United States Patent
Grevinga et al.

(10) Patent No.: US 9,798,451 B2
(45) Date of Patent: Oct. 24, 2017

(54) ELECTRONIC CONTROL AND DISPLAY UNIT

(71) Applicant: CLAAS SELBSTFAHRENDE ERNTEMASCHINEN GMBH, Harsewinkel (DE)

(72) Inventors: Markus Grevinga, Saerbeck (DE); Michael Losch, Versmold (DE)

(73) Assignee: CLAAS SELBSTFAHRENDE ERNTEMASCHINEN GMBH, Harsewinkel (DE)

( * ) Notice: Subject to any disclaimer, the term of this patent is extended or adjusted under 35 U.S.C. 154(b) by 187 days.

(21) Appl. No.: 13/962,258

(22) Filed: Aug. 8, 2013

(65) Prior Publication Data

US 2014/0053093 A1 Feb. 20, 2014

(30) Foreign Application Priority Data

Aug. 17, 2012 (DE) .................. 10 2012 107 552

(51) Int. Cl.
| | | |
|---|---|---|
| *G06F 3/0484* | (2013.01) | |
| *G06F 3/0488* | (2013.01) | |
| *G06F 3/0481* | (2013.01) | |
| *G06F 3/0485* | (2013.01) | |
| *G06F 3/0486* | (2013.01) | |
| *A01D 41/127* | (2006.01) | |

(52) U.S. Cl.
CPC ....... *G06F 3/04842* (2013.01); *A01D 41/127* (2013.01); *G06F 3/0485* (2013.01); *G06F 3/0486* (2013.01); *G06F 3/04817* (2013.01); *G06F 3/04883* (2013.01); *G06F 3/04886* (2013.01); *G06F 2203/04803* (2013.01); *G06F 2203/04806* (2013.01); *G06F 2203/04808* (2013.01)

(58) Field of Classification Search
CPC ................... G06F 2203/04803; G06F 3/04842
See application file for complete search history.

(56) References Cited

U.S. PATENT DOCUMENTS 7,337,023 B2 2/2008 Diekhans
7,418,669 B2 8/2008 Melzer
(Continued)

FOREIGN PATENT DOCUMENTS

| | | |
|---|---|---|
| DE | 102 03 370 | 7/2003 |
| EP | 1 650 715 | 4/2006 |
| EP | 2068236 | 10/2009 |

OTHER PUBLICATIONS

Anonymous: "Terra Felis 2", Dec. 31, 2010, pp. 1-16, URL: https://www.yumpu.com/de/document/download/8693067/a44da-145c4-2f2cd-fa57a-172e0-97482-7332a-e43c8 (with English abstract).

(Continued)

Primary Examiner — Sherrod Keaton
(74) Attorney, Agent, or Firm — Michael J. Striker

(57) ABSTRACT

An electronic control and display unit includes at least one display that has a touchscreen monitor and at least one control unit. The display has a plurality of visualization regions having visualization content. The touchscreen monitor associated with the display is subdivided into visualization regions and the visualization content of each visualization region is editable independently of the visualization content of the remaining visualization regions using available touchscreen functions.

7 Claims, 8 Drawing Sheets

(56) References Cited

U.S. PATENT DOCUMENTS

| | | | |
|---|---|---|---|
| 2006/0069485 A1* | 3/2006 | Diekhans | A01F 15/08 701/50 |
| 2006/0174212 A1* | 8/2006 | Cok | 715/786 |
| 2006/0271287 A1* | 11/2006 | Gold et al. | 701/211 |
| 2008/0239133 A1* | 10/2008 | Cazier | H04N 5/23293 348/333.05 |
| 2009/0064055 A1 | 3/2009 | Chaudhri et al. | |
| 2009/0077488 A1 | 3/2009 | Ording | |
| 2010/0010667 A1* | 1/2010 | Sauder | A01B 79/005 700/231 |
| 2010/0162181 A1 | 6/2010 | Shiplacoff et al. | |
| 2010/0275150 A1* | 10/2010 | Chiba | G06F 3/0488 715/784 |
| 2011/0154268 A1* | 6/2011 | Trent, Jr. | G06F 3/04883 715/863 |
| 2011/0252357 A1 | 10/2011 | Chaudhri | |
| 2012/0289290 A1* | 11/2012 | Chae | G06F 3/0488 455/566 |

OTHER PUBLICATIONS

Anonymus: "Holmer Terra Felis 2—Erfolg Auf Der Ganzen Linie!—Holmer Maschinenbau GMBH—Pressemitteilung", Sep. 8, 2011, pp. 1-2, Internet: URL: https://www.pressebox.de/inaktiv/holmer-maschinenbau-gmbh/HOLMER-Terra-Felis-2-Erfolg-auf-der-ganzen-Linie/boxid/445866 (with English translation).

* cited by examiner

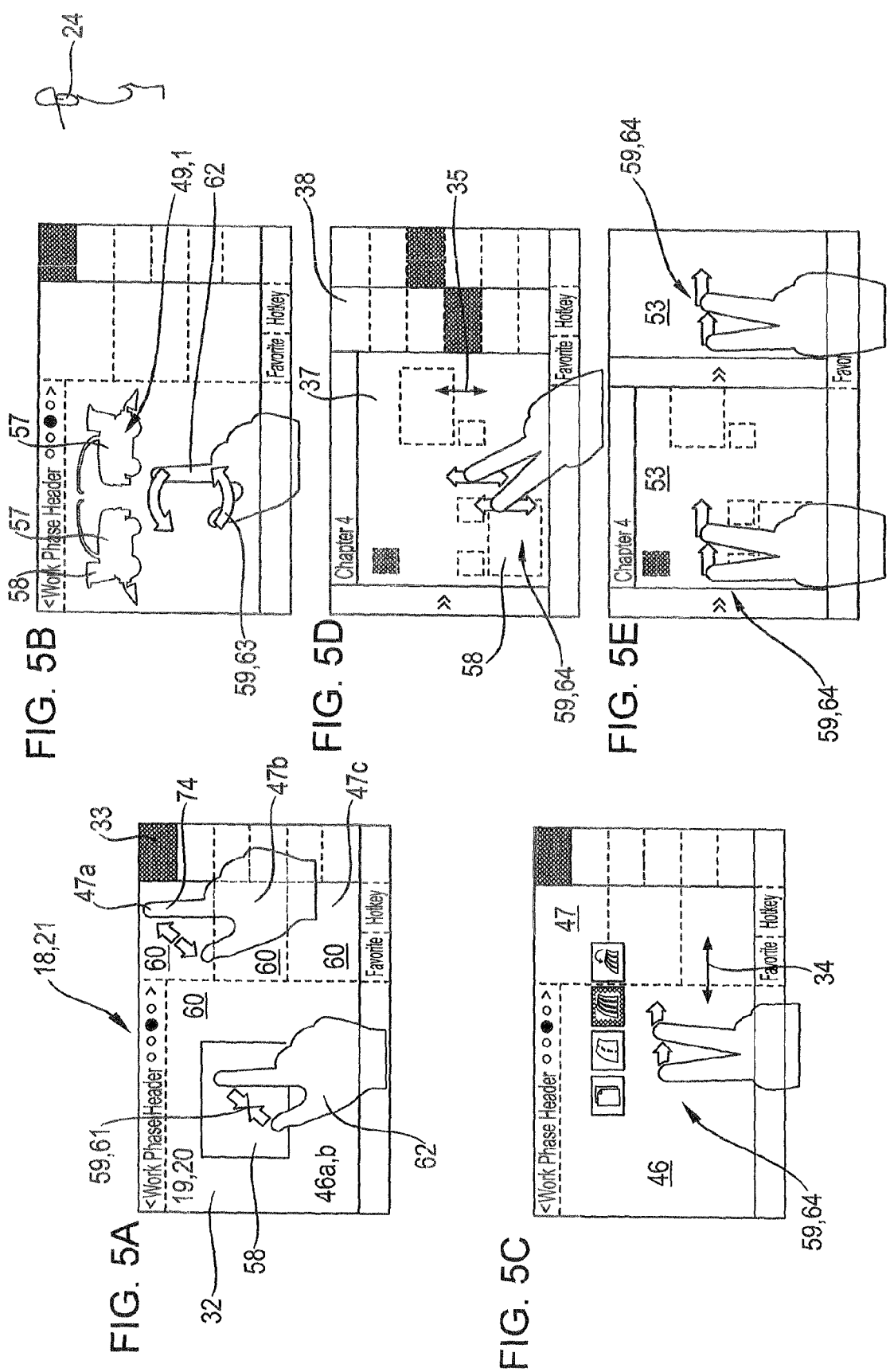

ELECTRONIC CONTROL AND DISPLAY UNIT

CROSS-REFERENCE TO A RELATED APPLICATION

The invention described and claimed hereinbelow is also described in German Patent Application DE 10 2012 107552.2, filed on Aug. 17, 2012. The German Patent Application, subject matter of which is incorporated herein by reference, provides the basis for a claim of priority of invention under 35 U.S.C. 119(a)-(d).

BACKGROUND OF THE INVENTION

The invention relates to an electronic control and display unit comprising a display designed as a touchscreen monitor and comprising at least one control unit, wherein the display has a plurality of visualization regions having visualization content.

A plurality of display devices designed as a touchscreen monitors are known from the prior art that are used to visualize and edit processes, e.g., on mobile agricultural working machines. Document DE 102 03 370, for example, makes known a method for controlling a user interface, in which an interactive user interface permits the visualization of a plurality of control windows. In addition to the overlapping depiction of display windows, which is known per se, the aforementioned document proposes that, when an additional display window is activated, the currently activated display window is reduced in size such that the content of all active display windows is visible.

Such known display systems, however, have a disadvantage that a plurality of information is visualized directly on the screen even if the information does not need to be monitored or edited at the time. This large amount of information can result in the overstimulation of an operator of the machine since a considerable amount of information is always accessible and the operator must handle the prioritization by her/himself in order to distinguish important information from less important information. In addition, it is difficult to orient one's self to a display structured as are the known display systems since the screen structure constantly changes.

Document EP 1 650 715 makes known a display procedure in which new information that is added and is needed for the particular process is visualized in an edge region of a display, while general machine-related information that was previously the only information visualized on, the monitor is zoomed such that it is still readable. The new information is positioned in an outer region of the display so that is easily accessed and, therefore, easier to edit. Although a visualization device so structured ensures better orientation on the screen, the device or system is disadvantageous in that the large amount of visualized information may not be required for the process currently underway resulting in unnecessary overstimulation of the driver operating the particular agricultural working machine when confronted with the visualized information.

SUMMARY OF THE INVENTION

The present invention overcomes the shortcomings of known arts, such as those mentioned above.

To that end, the present invention provides a provides a visualization device that only visualizes or presents context-relevant parameters and permits rapid navigation between different menu levels via the use of suitable touchscreen functions.

In an embodiment, the touchscreen monitor associated with the electronic control and display unit is subdivided into visualization regions and the visualization content of each visualization region is editable independently of the visualization content of the other visualization regions by means of available touchscreen functions. Such operation ensures that only context-relevant parameters are visualized and makes rapid navigation between different menu levels via the use of suitable touchscreen functions possible.

Additionally, the visibility of individual visualization regions is improved mainly in that one or more visualization regions are zoomable independently of the remaining visualization regions.

To permit right- and left-side views of agricultural working machines to be depicted on the display easily and rapidly, the invention provides that one or more visualization regions comprise a plurality of visualized icons and that touching the touchscreen monitor with two fingers making a circular motion prompts the particular icon to be displayed as a mirror image while the original depiction of the icon is retained.

As mentioned above, depending on the machine parameters, the visualization regions shown on the display can contain so much information that it is not meaningful or possible to visualize all this information simultaneously in the display. In order to permit rapid navigation between these extensive bits of information, the invention provides that scrolling the particular visualization region horizontally or vertically using two fingers increases the scrolling speed in the particular visualization region. Such navigation capability is used in a highly flexible manner when the horizontal or vertical scrolling using two fingers is carried out independently in visualization regions that are visualized simultaneously.

In an embodiment, the electronic control and display unit comprises at least one display having a plurality of visualization regions and that is operated in navigation levels, wherein the display is subdivided into visualization regions within a navigation level and at least a portion of the visualization regions can be moved relative to one another. This configuration ensures that only context-relevant parameters are ever visualized and that visualization according to a repeating pattern results in the rapid orientation of the operator in the navigation levels. Given that, in this context, the movability of the visualization regions relative to one another includes horizontal and/or vertical scrolling of the particular visualization region, the operator is provided with an efficient, widespread navigation structure that is easy to learn and quickly leads to the parameter to be selected on the display.

Preferably, the display comprises, in a first navigation level, at least one "working phase" visualization region and one "tool menu" visualization region. The "working phase" visualization region can be scrolled horizontally and the "tool menu" visualization region can be scrolled vertically. This enables an operator to quickly discern which tools are available and which working environments that relate to the available tools are themselves available.

In order to ensure that the operator permanently and subconsciously knows which navigation level is currently being navigated, the display structure is designed such that a second navigation level has at least one "tool content" visualization region, one "tool menu" visualization region and one "tool submenu" visualization region. All visualization regions can be scrolled vertically. Given that scrolling is performed only vertically in this navigation level, the user immediately recognizes which menu level is currently being navigated based on the type of operation.

Also, a selected tool may be quickly deselected or cancelled in that touching an activated visualization region outside of an icon that describes the visualization region causes an activated menu window to close, and/or causes implemented changes to be reset.

To ensure that an operator can optimally adapt the display structure to his needs, the invention provides that the configuration of the display is edited in at least one of the available navigation levels. In the simplest case, this free configurability is ensured in that the visualization regions available in the particular navigation level comprise a plurality of configurable subregions. Each of the subregions may be edited such that the content of a tool stored in a visualization region is dragged into the particular subregion.

In an embodiment, open pop-up windows are quickly closed in that, when one or more pop-up windows are open in the display, dragging an open pop-up window horizontally using two fingers causes this pop-up window to close.

BRIEF DESCRIPTION OF THE DRAWINGS

Further features and advantages of the invention will become apparent from the description of embodiments that follows, with reference to the attached figures, wherein:

FIGS. 5A-5E together depict of functions for activating a touchscreen monitor according to the invention.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
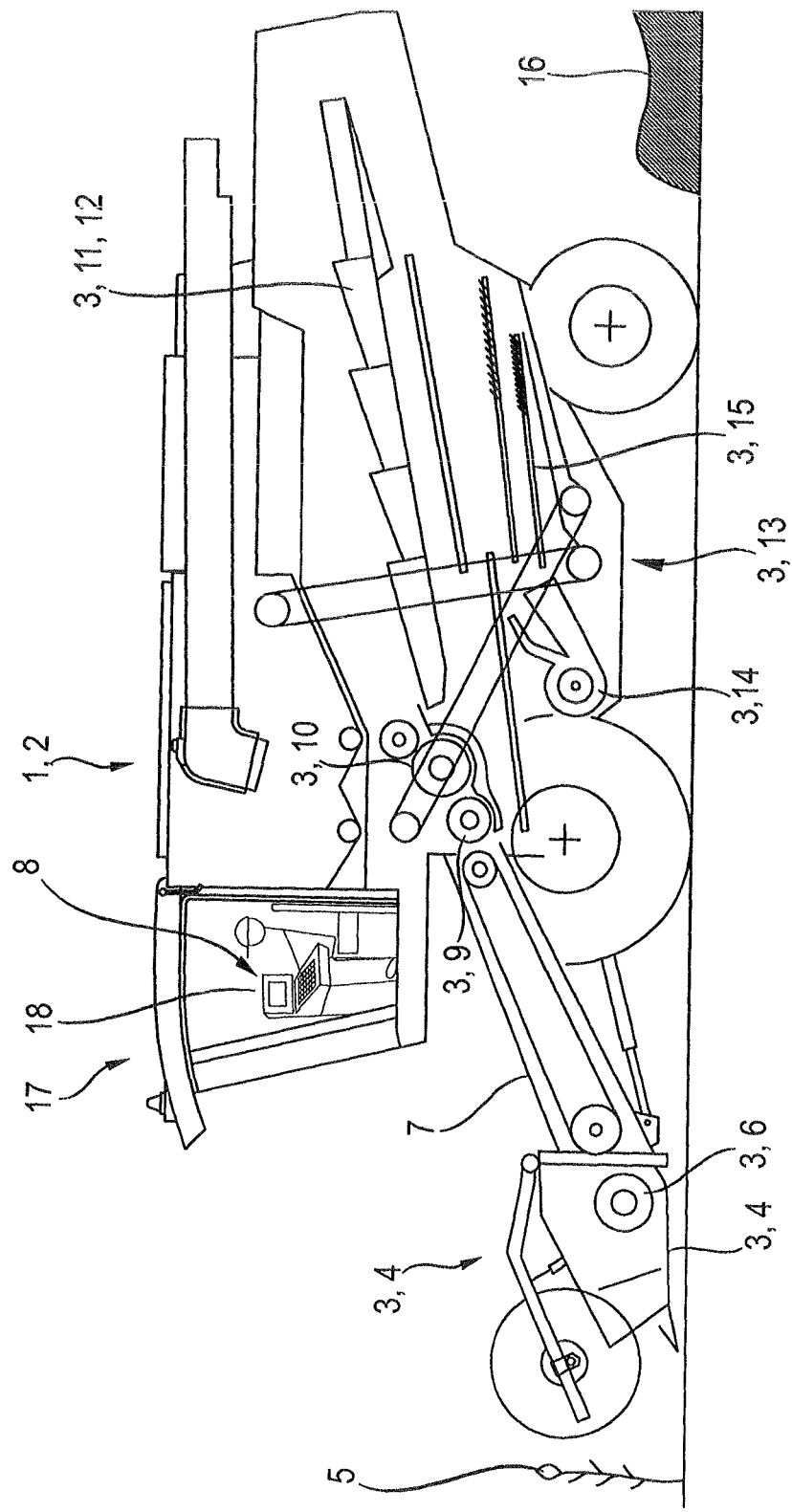
FIG. 1 depicts a combine harvester with a control and display unit of the invention.

FIG. 1 depicts an agricultural working machine 1 configured as a combine harvester 2 and the working units 3 thereof. The combine harvester 2 accommodates a header 4 in the front region thereof. The header 4 picks up crop 5, cuts the crop and transfers the crop via a feed device 6 to the downstream feed rake 7. Via the feed rake 7, the crop 5 is transferred in a manner known per se to the threshing devices. In this case, the threshing devices comprise a first cylinder 9 and, downstream thereof, a second cylinder 10. To further separate the grain, the crop stream is conveyed to a separating device 11, such as a tray-type shaker 12, and to a cleaning device 13. The cleaning device comprises a fan 14 and cleaning sieves 15. The separated straw is ejected from the rear region of the combine harvester 2 and is deposited in a swath 16 on the ground or is widely distributed on the ground.

An electronic control and display unit 8, constructed according to the invention, is disposed in the cab 17. A driver of the combine harvester 2 can enter the settings for the various working units 3 and thereby adapt the harvesting operation to the specific crop conditions. In addition, the driver of the combine harvester 2 always has an overview of the machine and/or crop data visualized in the display 18 of the control and display unit 8 disposed in the cab 17. While the agricultural working machine 1 depicted in FIG. 1 is a combine harvester 2, the invention is not limited to use therein but also may be incorporated in a forage harvester, a tractor of like agricultural working machine.

Figures 2A, 2B:
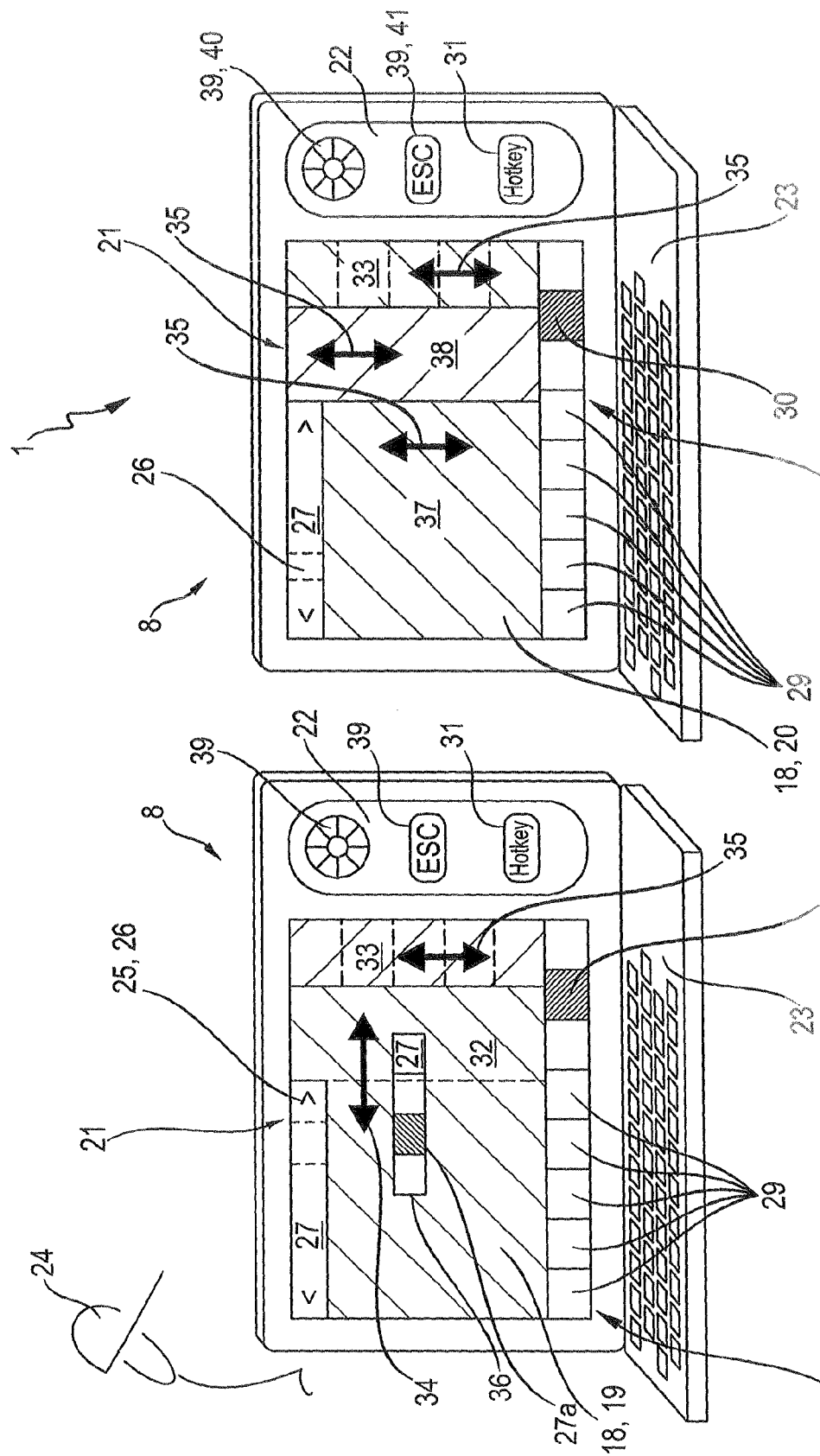
FIG. 2A depicts the inventive control and display unit in a first navigation level.
FIG. 2B depicts the control and display unit in a second navigation level.

FIGS. 2A and 2B depict the inventive control and display unit 8. FIG. 2A depicts a first navigation level 19 and FIG. 2B depicts a second navigation level 20 of the display 18 associated with the control and display unit 8. In addition to the display 18, which is preferably a touchscreen monitor 21, the control and display unit 8 comprises a first control unit 22. First control unit 22 permits navigation within one navigation level 19, 20. At least one further control unit 23 enables an operator 24 can provide input. The first and second control units 22, 23 may be combined to form a single control unit in a non-illustrated manner, without deviating from the scope and spirit of the invention. The display 18 is a touchscreen monitor 21 that includes a display region 26 at the top thereof. Display region 26 is designed as a header menu bar 25 and is displayed permanently at least in the first navigation level 19. The header menu bar 25 comprises the working phases 27 of the agricultural working machine 1. Each of the working phases 27 are selected by the operator 24 of the agricultural working machine 1 horizontally scrolling the header menu bar 25 via touchscreen functionality.

A further display region 28, which is visible at all navigation levels 19, 20, is associated with the display 18 at the lower edge thereof. Display region 28 comprises a "favorites" 29 display region and a "hotkey" 30 display region, wherein system-relevant information is permanently visualized in the "favorites" 29 display region and navigation level-relevant information is visualized in the "hotkey" 30 display region by activating the particular display region 29. The navigation level-relevant information stored in the "hotkey" button 30 is activated either by touching this button on the display 18, which is designed as a touchscreen monitor 21, or by pressing the "hotkey" button 31 disposed in the first control unit 22.

The display 18, which is operated at navigation levels 19, 20 in a manner according to the invention, comprises, in a first navigation level 19, at least one "working phase" visualization region 32 and a "tool menu" visualization region 33. The operator 24 of the agricultural working machine 1 can navigate in the particular visualization region 32, 33 by horizontally scrolling 34 in the "working phase" navigation region 32 and vertically scrolling 35 in the "tool menu" visualization region 33. Since the display 18 is designed as a touchscreen monitor 21, the horizontal and vertical scrolling 34, 35 is accomplished by touching the display 18 and dragging the particular visualization region 32, 33 in the desired direction. To ensure that the operator 24 is informed about which working phase 32 is currently activated while scrolling in the "working phase" visualization region 32, a further display field 36 appears in the display 18. Display field 36 shows all the selectable working phases 27, wherein the currently activated working phase 27a is visualized in an emphasized manner.

In the further navigation level 20, the display 18 comprises at least one "tool content" visualization region 37, the "tool menu" visualization region 33 and a "tool submenu" visualization region 38. Each of the visualization regions 33, 37, 38 is navigated by vertical scrolling 35. In a manner analogous to the first navigation level 19, the vertical scrolling 35 is carried out by touching the display 18 and dragging the particular visualization region 33, 37, 38 in the desired direction. Moreover, in the second navigation level 20, navigation between the visualization regions 33, 37, 38 and within each visualization region 33, 37, 38 is carried out by control elements 39 assigned to the first control unit 22.

The first control unit 22 comprises a control element 39 designed as a rotate-and-press switch 40 that is rotated in order to switch back and forth between the visualization regions 33, 37, 38 and to navigate within a visualization region 33, 37, 38. The rotate-and-press switch 40 is pressed in order to confirm or select a selected function. The further control element 39 is designed as an escape button 41 and is used to reset an edit implemented using the rotate-and-press switch 40.

The display 18 is subdivided in the above-described first and second navigation levels 19, 20 into visualization regions 32, 33, 37, 38. At least one portion of the visualization regions 32, 33, 37, 38 are moved relative to one another. Accordingly, a navigation style is created that enables the operator 24 of the agricultural working machine 1 to change machine parameters quickly and transparently. The orientation within the available navigation levels 19, 20 is increased in that only horizontal scrolling 34 is implemented in a first navigation level 19, while only vertical scrolling 35 is implemented in the at least one further navigation level 20. The main effect thereof is that the operator 24 of the agricultural working machine recognizes which navigation level 19, 20 is currently being navigated on the basis of the movement of the visualization regions 32, 33, 37, 38.

Figure 3:
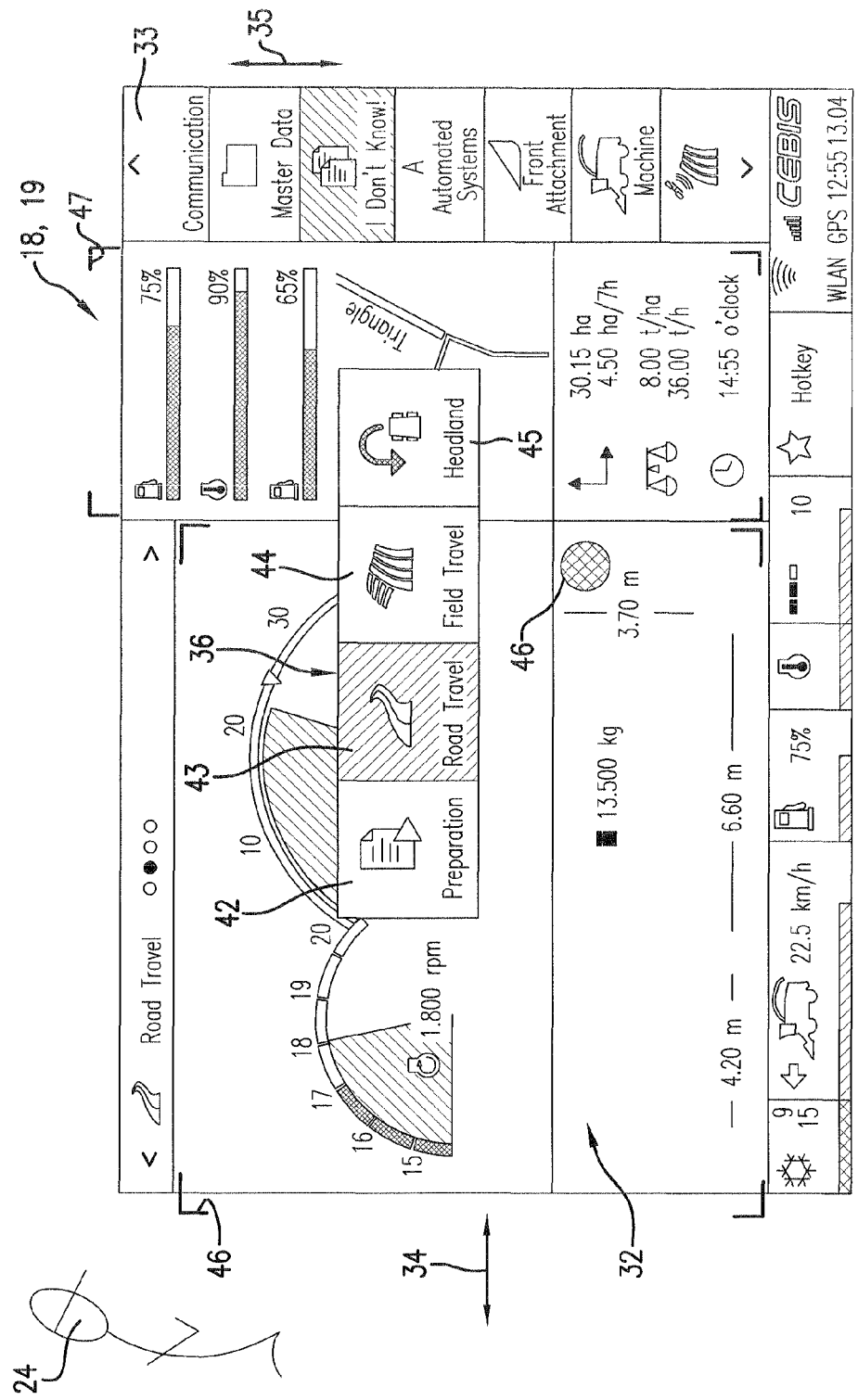
FIG. 3 depicts navigation using the inventive control and display unit in a first navigation level.
Figure 4A:
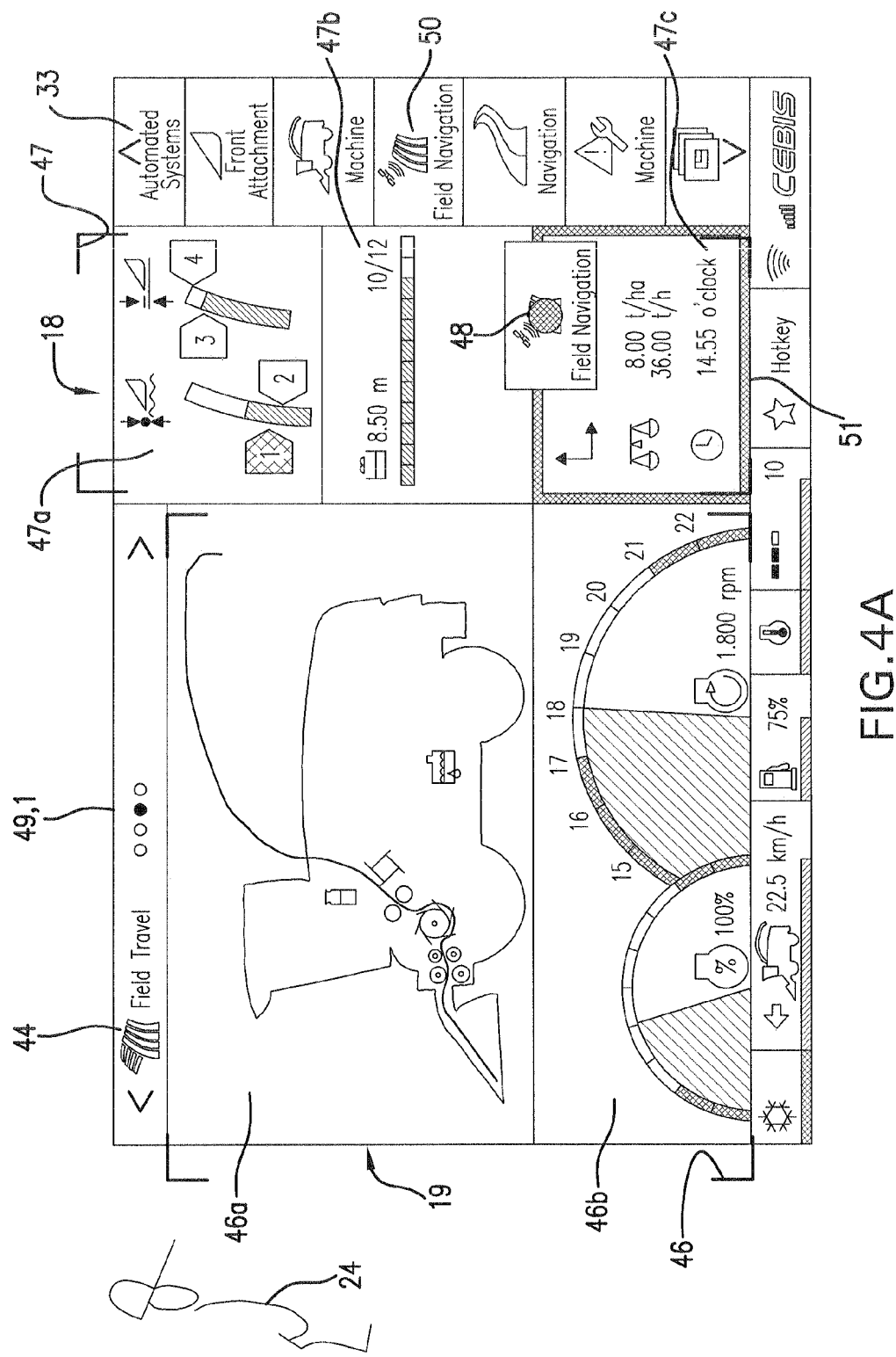
FIGS. 4A-D together depict how the display structure is changed in one navigation level according to the inventive control and display unit.
Figure 4B:
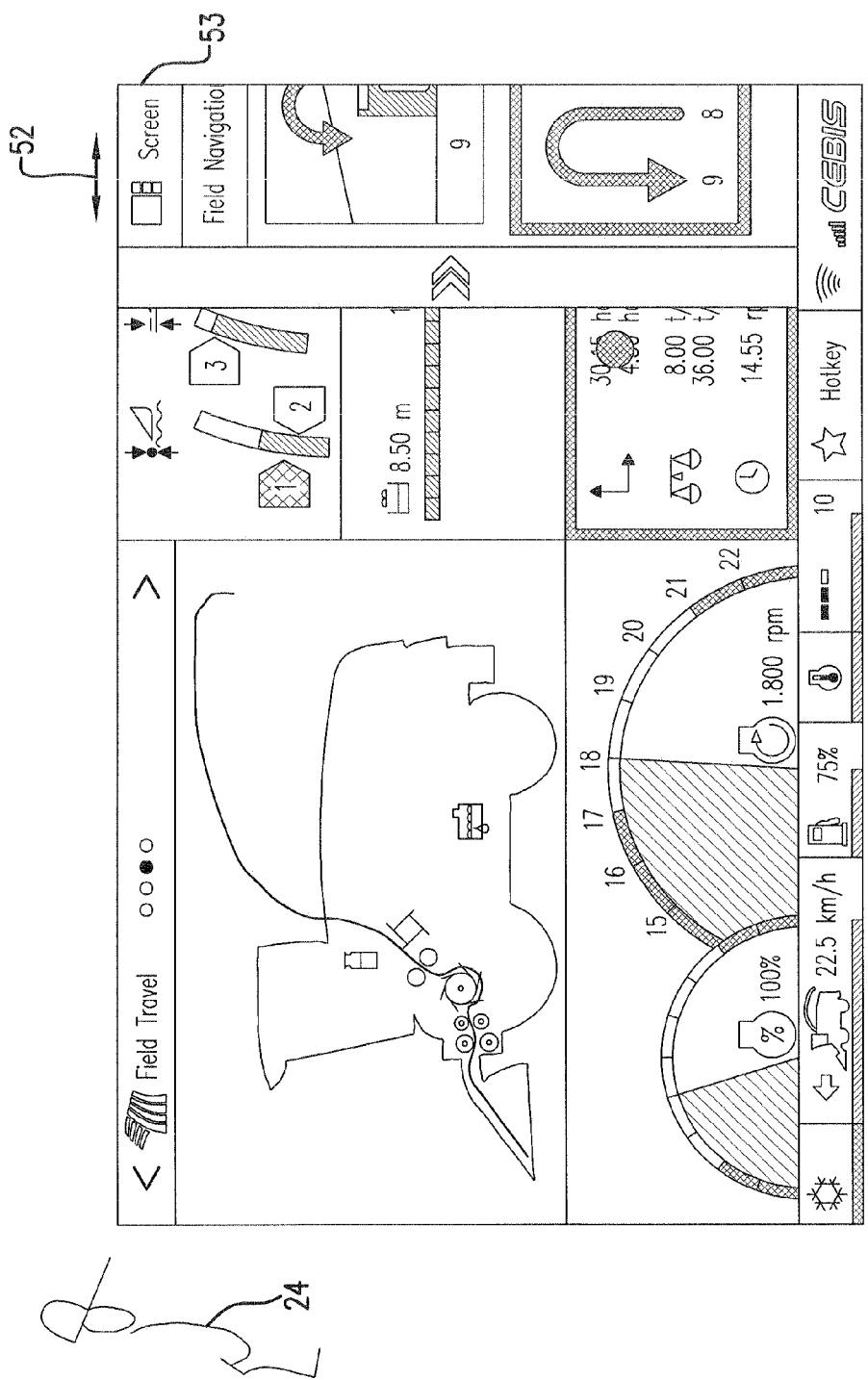
Figure 4C:
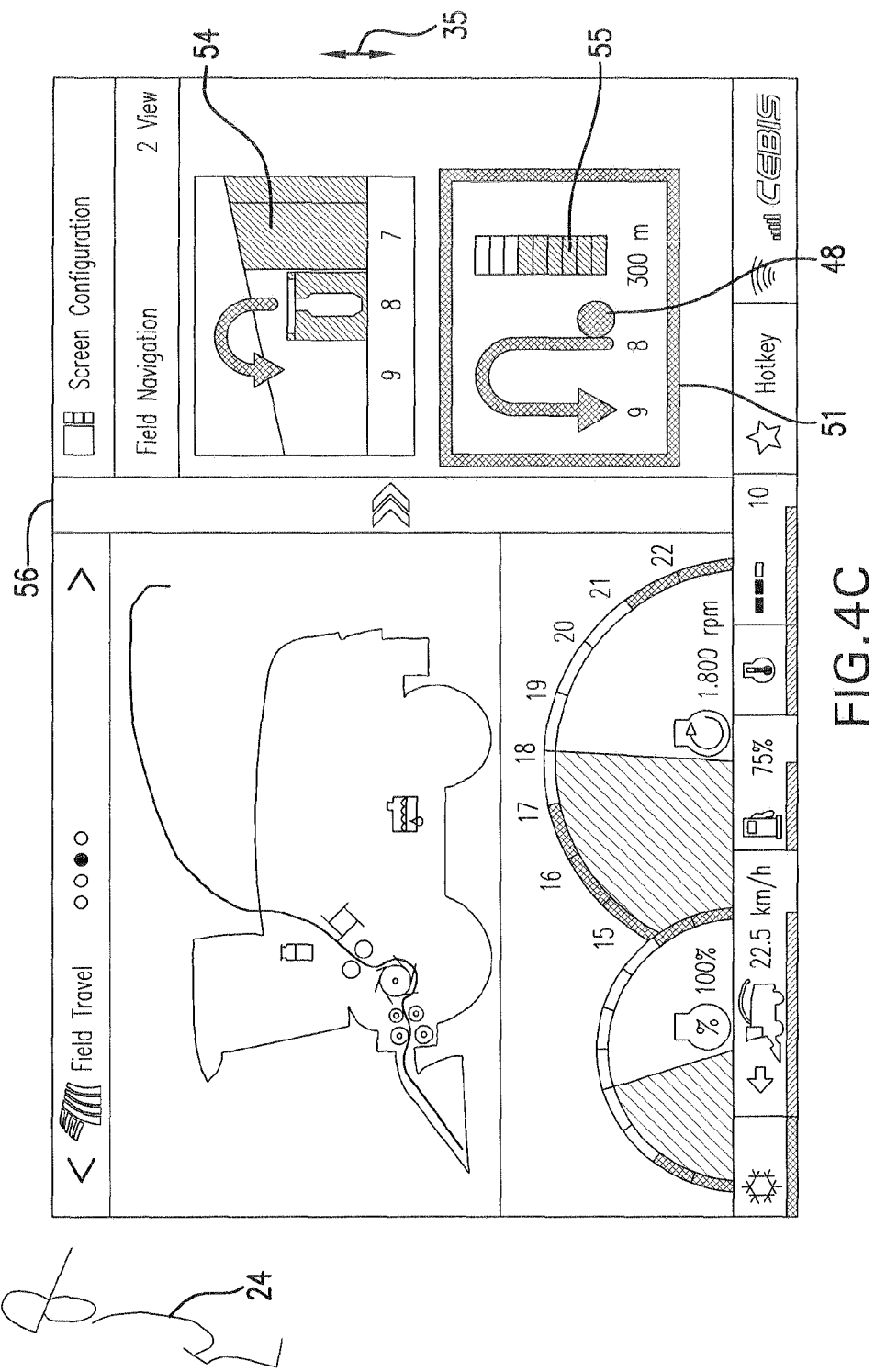
Figure 4D:
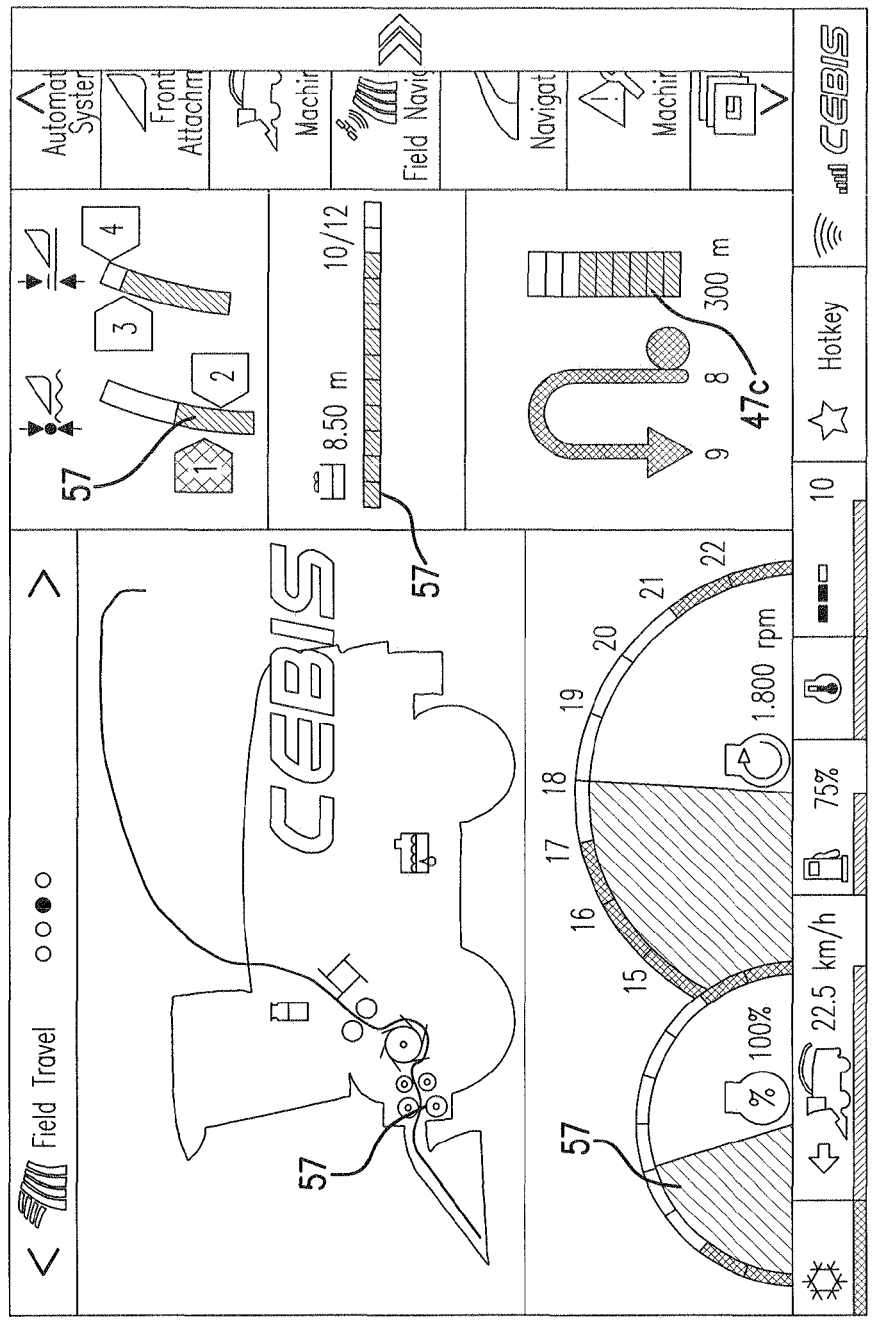

FIG. 3 shows a detailed view of the display 18 at the first navigation level 19. The display field 36, which visualizes the available working phases, comprises the working phases "preparation" 42, "road travel" 43, "field travel" 44, and "headland" 45. The visualization region of each working phase 42-45 is structured such that the visualization region comprises a "working phase content" visualization region 46 and at least one "tool view" visualization region 47. In the first navigation level 19, the operator 24 can select the desired working phase 42-45 by touching 48 the display 18 with a finger or a suitable object. That is, the operator either scrolls the "working phase" visualization region 32 in the horizontal direction 34 or taps the desired working phases 42-45 directly in the additional display field 36. Independently thereof, the operator 24 can navigate in the first navigation level 19 by vertical scrolling 35 in the "tool menu" visualization region 33.

FIGS. 4A, 4B, 4C, 4D together depict how the structure of the display 18 is changed in the first navigation level 19. Although the change in the display structure is described by reference to the first navigation level 19, it lies within the scope of the invention for the procedure to be described to also be applied to change the display structure in the second navigation level 20. Hence, a description of the procedure for changing the display structure in the second navigation level 20 is omitted for simplicity.

In the exemplary embodiment shown, the operator 24 of the forage harvester 49 has selected the "field travel" working phase 44. Each of the "working phase content" 46 and "tool view" 47 visualization regions are subdivided into subregions 46a-b and 47a-c, wherein the bits of information visualized in the subregions 46a-b, 47a-c are replaced within subregions. To perform editing, the operator 24 first selects a tool 50 (the "field navigation" tool in this case), via touch 48 in the "tool menu" visualization region 33 and drags it to one of the subregions 46a-b, 47a-c of the "working phase content" 46 or "tool view" 47 visualization regions.

In the exemplary embodiment shown, the "field navigation" tool 50 is dragged to the lowermost subregion 47c of the "tool view" visualization region 47. The activation of the subregion 47c is indicated by an edge 51, which is emphasized using color. If the operator 24 interrupts the contact in this subregion 47c, a pop-up window 53, which moved into the display from right to left in the horizontal direction 52, opens. The pop-up window comprises two alternative editing options 54, 55 for the "field navigation" tool 50 in this case. Given that the operator 24 selects, via touch 48, one of the alternative editing options 54, 55 from the pop-up window 53 (the pop-up window 53 completely covers the "tool view" visualization region 47), this editing option 55 is initially visually emphasized to indicate the selection thereof. In the simplest case, the edge 51 is emphasized using color. If the operator 24 then activates a close bar 56 positioned in the pop-up window 53, the pop-up window 53 is closed by moving it horizontally 52 out of the display 18 and, simultaneously, the selected editing option 55 has filled the previously selected, lowermost subregion 47c of the "tool view" visualization region 47. It lies within the scope of the invention for the selectable editing options 54, 55 to not be limited to visual aspects, but rather to also have various functions. It is also possible for more than the two described editing options 54, 55 to be available, in which case navigation between the selectable editing options 54, 55 is carried out by vertical scrolling 35 in the open pop-up window 53.

To switch from the first navigation level 19 to the next navigation level 20 after a desired working phase has been selected, the operator 24 touches one of the "working phase content" 46 or "tool view" 47 visualization regions. If the touch 48 takes place in the region of one of the icons 57 visualized on the display 18, the function or application associated with the icon 57 that is touched opens immediately. If a region between the icons 57 is touched, the only result is the switch between the navigation levels 19, 20, without this directly changing the display structure.

FIGS. 5A, 5B, 5C, 5D, 5E together show the actuation scenarios according to the invention for a display 19 designed as a touchscreen monitor 21. As described above, the display 18 is subdivided within each navigation level 19, 20 into different visualization regions 32, 33, 37, 38, 46, 47, wherein a plurality of visualization contents 58 is associated with each visualization region 32, 33, 37, 38, 46, 47. In order to permit quick navigation between the visualization contents 58 displayed in the various visualization regions 32, 33, 37, 38, 46, 47, and/or to limit the visualization content 58 to essential content and/or to make the content clearly visible, the available touchscreen functions 59 are used in one or more of the visualization regions 32, 33, 37, 38, 46, 47 independently of the remaining visualization regions 32, 33, 37, 38, 46, 47. Provided a visualization region 46, 47 according to FIG. 5A is subdivided into display regions 60 (which correspond in the simplest case to the previously described subregions 46a, b; 47a-c of the "working phase content" 46 and "tool view" 47 visualization regions), the touchscreen functions 59 according to the invention also may be used independently of one another in these display regions 60.

In a first actuation scenario, the touchscreen function 59 is designed as a zoom function 61. Therein, each of the display regions 60 or every visualization region 32, 33, 37, 38, 46, 47 is zoomed by the operator 24 via two-finger operation independently of the remaining display or visualization regions 32, 33, 37, 38, 46, 47, 60. According to FIG. 5A, the particular image section is enlarged or reduced by moving the fingers 62 (preferably the thumb and forefinger), toward one another or apart from each other. It also is possible (as indicated in FIG. 5B), to create a mirror image of the visualized icon 57 via a circular motion 63 of the fingers 62 (preferably the thumb and forefinger), on the touchscreen monitor 21, wherein the depiction of the original icon 57 is retained. In the exemplary embodiment shown, this mirroring function causes the agricultural working machine 1 (i.e., forage harvester 55) to be shown from the right side and the left side on the display 18, thereby making it possible to see all the details of the particular side of the machine.

In a further embodiment, the touchscreen monitor 21 are designed according to FIGS. 5C and 5D such that a dragging touch 64 of the display 18 in the horizontal or vertical direction results in an increase in the speed of the vertical or horizontal scrolling 34, 35. As in the above-described touchscreen functions 59, horizontal and vertical scrolling 64 takes place independently of each other in the most diverse visualization and display regions 32, 33, 37, 38, 46, 47, 60 (FIG. 2) using the example of vertical scrolling 35 in the visualization regions 37, 38, 33 of the second navigation level 20. As shown in FIG. 5E, in cases where one or more pop-up windows 53 are open, horizontal dragging 64 using two fingers is implemented to automatically close the pop-up window 53 that is touched in this manner.

It lies within the scope of the invention that the agricultural working machine 1, which may be controlled using the inventive control and display unit 8, is not limited to a combine harvester 2 or a forage harvester 49, but rather to have any possible agricultural working machine design known to those with skill in the art, e.g., a tractor-mounted implement combination. In addition, the parameters 64 that are set using the control and display unit 8 can be of any type, such as machine parameters, quality parameters of the agricultural working machine, quality parameters of the crop, and crop parameters.

LIST OF REFERENCE CHARACTERS 1 agricultural working machine
2 combine harvester
3 working unit
4 header
5 crop
6 feed device
7 feed rake
8 control and display unit
9 first cylinder
10 second cylinder
11 separating device
12 tray-type shaker
13 cleaning unit
14 fan
15 cleaning sieve
16 swath
17 cab
18 display
19 first navigation level
20 second navigation level
21 touchscreen monitor
22 first control unit
23 second control unit
24 operator
25 header menu bar
26 display region
27 working phases
28 display region
29 "favorites" display region
30 "hotkey" display region
31 "hotkey" button
32 "working phases" visualization region
33 "tool menu" visualization region
34 horizontal scrolling
35 vertical scrolling
36 display field
37 "tool content" visualization region
38 "tool submenu" visualization region
39 control element
40 rotate-and-press switch
41 escape button
42 preparation
43 road travel
44 field travel
45 headland
46 "working phase content" visualization region
46a, ID subregion
47 "tool view" visualization region
48 touch
49 forage harvester
50 tool
51 edge
52 horizontal direction
53 pop-up window
54, 55 editing option
56 closing bar
57 icon
58 visualization contents
59 available touchscreen functions
60 display region
61 zoom function
62 finger
63 circular motion
64 dragging motion As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working machine configured with an electronic control and display unit, wherein the electronic control and display unit comprises:
a display with a touchscreen monitor, wherein display operates in at least first and second navigation levels that can be subdivided into one or more visualization regions having visualization content, and
a control unit, wherein the visualization regions in the at least first and second navigation levels can be scrolled, and zoomed independently of the remaining visualization regions, wherein scrolling a particular visualization region horizontally or vertically using two fingers increases the scrolling speed therein, wherein the visualization regions comprise a plurality of configurable subregions, wherein the visualization content comprises at least one tool, wherein the visualization content of each of the visualization regions is editable independently of the visualization content of the remaining visualization regions, using touchscreen functions, wherein each of the subregions are editable such that content of a tool stored in a visualization region is draggable into a subregion, which activates the subregion for editing according to a first editing option for the selected tool, wherein operation in the first editing option can be interrupted to cause a pop-up window that presents additional alternative editing options for the tool, which are selectable, and wherein navigation between the selectable editing options is carried out via vertical scrolling.

2. The agricultural working machine according to claim 1, wherein the visualization regions comprise a plurality of visualized icons, and wherein touching the touchscreen monitor with two fingers making a circular motion prompts a particular icon to be displayed as a mirror image while the original depiction of the icon is retained.

3. The agricultural working machine according to claim 1, wherein the horizontal or vertical scrolling using two fingers takes place independently of one another in simultaneously visualized visualization regions.

4. The agricultural working machine according to claim 1, wherein the display comprises, in the first navigation level, at least one "working phase" visualization region and one "tool menu" visualization region, and wherein the "working phase" visualization region is scrollable horizontally and the "tool menu" visualization region is scrollable vertically.

5. The agricultural working machine according to claim 1, wherein the display comprises, in the second navigation level, at least one "tool content" visualization region, a "tool menu" visualization region and a "tool submenu" visualization region, and wherein all of the visualization regions are scrollable vertically.

6. The agricultural working machine according to claim 1, wherein touching an activated visualization region outside of an icon that describes the visualization region causes an activated display region or pop-up window or both to close, or causes implemented changes to be reset or both.

7. The agricultural working machine according to claim 1, wherein when one or more pop-up windows are open in the display, dragging an open pop-up window horizontally using two fingers causes this pop-up window to close.

\* \* \* \* \*